US009995587B2

United States Patent
Haberl

(10) Patent No.: US 9,995,587 B2
(45) Date of Patent: Jun. 12, 2018

(54) SYSTEM TO DEVELOP TOPOGRAPHICAL DATA

(71) Applicant: GM GLOBAL TECHNOLOGY OPERATIONS LLC, Detroit, MI (US)

(72) Inventor: Samuel T. Haberl, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 84 days.

(21) Appl. No.: 15/234,422

(22) Filed: Aug. 11, 2016

(65) Prior Publication Data

US 2018/0045520 A1     Feb. 15, 2018

(51) Int. Cl.
*G01C 21/32*     (2006.01)
*G06F 17/30*     (2006.01)

(52) U.S. Cl.
CPC ....... *G01C 21/32* (2013.01); *G06F 17/30241* (2013.01)

(58) Field of Classification Search
None
See application file for complete search history.

(56) References Cited

U.S. PATENT DOCUMENTS

| | | | | |
|---|---|---|---|---|
| 6,385,533 | B1 * | 5/2002 | Halt | G01C 21/32 340/905 |
| 8,977,422 | B1 * | 3/2015 | Westfall | G07C 5/006 701/30.6 |
| 9,751,527 | B2 * | 9/2017 | Moeller | B60W 30/09 |
| 9,816,823 | B2 * | 11/2017 | Wang | G01C 21/32 |
| 2008/0262988 | A1 * | 10/2008 | Williams | G06N 3/12 706/13 |
| 2012/0203428 | A1 * | 8/2012 | Choi | B60G 17/016 701/37 |
| 2015/0166072 | A1 * | 6/2015 | Powers | B60W 40/06 701/1 |
| 2015/0341862 | A1 | 11/2015 | Lei et al. | |
| 2017/0138752 | A1 * | 5/2017 | Mermelstein | G01C 21/3484 |
| 2017/0277716 | A1 * | 9/2017 | Giurgiu | G06F 17/30241 |

* cited by examiner

*Primary Examiner* — Mussa A Shaawat
*Assistant Examiner* — Abdhesh K Jha

(57) ABSTRACT

A system to develop topographical data in a mapping database is herein presented. The system includes: a memory including one or more executable instructions and the mapping database; a controller configured to read and execute the one or more executable instructions; a sensor configured to determine when the vehicle encounters a road surface feature and subsequently send a surface-variation signal including a topographic coordinate update corresponding to the road surface feature. The executable instructions enable the controller to: receive the surface-variation signal from the sensor; and collaborate with the mapping database to develop the topographical data with the topographic coordinate update.

5 Claims, 8 Drawing Sheets

US 9,995,587 B2

SYSTEM TO DEVELOP TOPOGRAPHICAL DATA

INTRODUCTION

Recognition and localization of traditional road features (i.e., landmarks such as signs and stoplights) can be a difficult task for the sensor systems of vehicles when the landmarks have been previously damaged. These damaged landmarks may further confuse the vehicles systems while attempting to localize the vehicle at locations displaying landmarks in conflict with those previously stored within the vehicle databases. Many non-traditional landmarks, however, have yet to be recorded for localization purposes. Discrete landmarks (e.g., expansion joints situated between a road and adjoining bridge) could thus be recorded to improve vehicle localization, especially when traditional landmarks have been unexpectedly removed or damaged. These non-traditional landmarks may moreover get sensed through sensors systems not generally in collaboration with the current vehicles localization systems such as the vehicle camera systems, LIDAR systems, and radar systems. It is therefore desirable for non-traditional road features to be recorded for vehicle localization purposes. It is further desirable for these non-traditional features to be sensed through systems not generally implemented for vehicle localization purposes.

SUMMARY

A system to develop topographical data in a mapping database is herein presented. The system includes: a memory including one or more executable instructions and the mapping database; a controller configured to read and execute the one or more executable instructions; a sensor configured to determine when the vehicle encounters a road surface feature and subsequently send a surface-variation signal including a topographic coordinate update corresponding to the road surface feature. The executable instructions enable the controller to: receive the surface-variation signal from the sensor; and collaborate with the mapping database to develop the topographical data with the topographic coordinate update.

The system may further include: a communication device configured to communicate with a remote party. The executable instructions would further enable the controller to: collaborate with the communication device and memory to send the remote party communications including the developed topographical data.

The sensor may be a dynamics sensor connected with the vehicle suspension system. The sensor may also be a microphone configured to determine when the vehicle encounters a road surface feature from road noise and signal when the vehicle encounters the road surface feature. The road surface feature may be an expansion joint, rumble strip, lane-cross gap, pothole, or road surface change. The mapping database may corresponds to a High Definition Map with a plurality of topographical data coordinates.

Another system to develop topographical data in a mapping database is herein presented. The system includes: a memory comprising one or more executable instructions and the topographical data; a controller configured to read and execute the one or more executable instructions; a sensor configured to signal when the vehicle encounters a road surface feature. The executable instructions enable the controller to: receive a surface-variation signal from the sensor; collaborate with the mapping database to determine the road surface feature based off at least a selected portion of the surface-variation signal; collaborate with the mapping database to develop the topographical data with a topographic coordinate update when the road surface feature is determined of a certain type.

The system may further include: a communication device configured to communicate with a remote party. The executable instructions would further enable the controller to: collaborate with the communication device and memory to send the remote party communications including the developed topographical data.

The sensor may be a dynamics sensor connected with the vehicle suspension system. The sensor may also be a microphone configured to determine when the vehicle encounters a road surface feature from road noise and signal when the vehicle encounters the road surface feature. The road surface feature may be an expansion joint, rumble strip, lane-cross gap, pothole, or road surface change. The mapping database may corresponds to a High Definition Map with a plurality of topographical data coordinates.

Another system to develop topographical data in a mapping database is further herein presented. The system includes: a memory comprising one or more executable instructions and the mapping database; a controller configured to read and execute the one or more executable instructions; a first sensor configured to determine when the vehicle encounters a road surface feature and subsequently send a first signal including a first topographic coordinate update corresponding to the road surface feature; a second sensor configured to determine when the vehicle encounters a road surface feature and subsequently send a second signal including a second topographic coordinate update corresponding to the road surface feature. The executable instructions enable the controller to: receive the first signal from the first sensor; receive the second signal from the second sensor; verify the accuracy of the first and second topographical coordinate updates; and collaborate with the mapping database to develop the topographical data with one of the first and second topographic coordinate updates when the first and second signals are verified to be accurate.

The system may further include: a communication device configured to communicate with a remote party. The executable instructions would further enable the controller to: collaborate with the communication device and memory to send the remote party communications including the developed topographical data.

The first and second topographical coordinate updates may be verified accurate when each correspond to a substantially identical geographic location. The first sensor may be a dynamics sensor connected with the vehicle suspension system. The second sensor may be a microphone configured to determine when the vehicle encounters a road surface feature from road noise and signal when the vehicle encounters the road surface feature. The road surface feature may be an expansion joint, rumble strip, lane-cross gap, pothole, or road surface change. The mapping database may corresponds to a High Definition Map with a plurality of topographical data coordinates.

DETAILED DESCRIPTION

Figure 1:
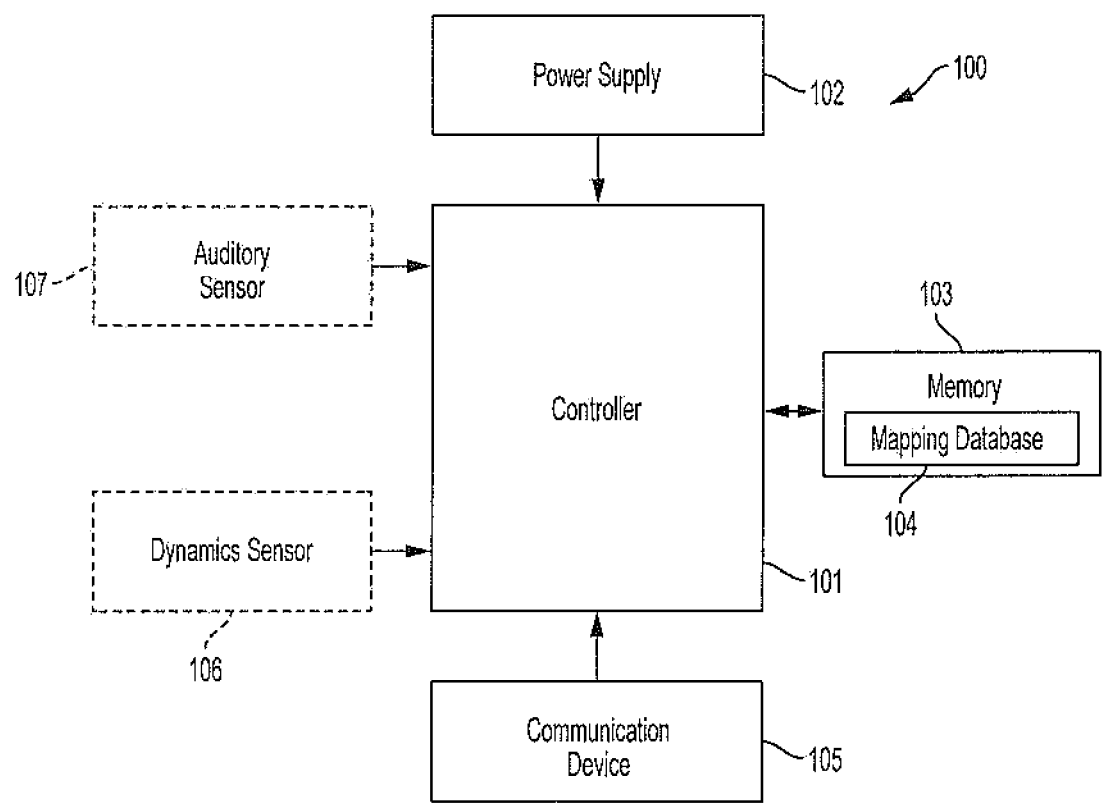
FIG. 1 shows an exemplary block diagram of an exemplary embodiment of a system to develop topographical data in a mapping database.

A system and method to develop topographical data in a mapping database will now be described in detail with reference to FIGS. 1-7 of the accompanying drawings in which like reference numerals refer to like elements throughout. The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "formed on," or "disposed on" a second element, the first element may be connected directly to, formed directly on or disposed directly on the second element or there may be intervening elements between the first element and the second element, unless it is stated that a first element is "directly" connected to, formed on, or disposed on the second element. In addition, if a first element is configured to "receive" information from a second element, the first element may receive the information directly from the second element, receive the information via a bus, receive the information via a network, or receive the information via intermediate elements, unless the first element is indicated to receive information "directly" from the second element.

Throughout the disclosure, one or more of the elements disclosed may be combined into a single device or combined into one or more devices. In addition, individual elements may be provided on separate devices. It should moreover be appreciated that the vehicle may be, but is not limited to, a passenger car, motorcycle, truck, sports utility vehicle (SUVs), recreational vehicle (RVs), and may even extend to a marine vessel, or aircraft.

Referring to the drawings in detail, and specifically to FIG. 1, a block diagram of an exemplary system to develop topographical data in a mapping database is generally indicated by reference numeral 100. As shown, the disclosed system 100 includes a controller 101, a power supply 102, a memory 103, a dynamics sensor 106, and an auditory sensor 107. System 100 may further include a communication device 105. However, system 100 is not limited to the aforementioned configuration and may be configured to include additional elements and/or omit one or more of the aforementioned elements.

Controller 101 essentially controls the overall operation and function of system 100. Upon reading and executing one or more executable instructions, controller 101 may control, send, and/or receive information from one or more of memory 103, dynamics sensor 106, auditory sensor 107, and communication device 105 of system 100. The controller 101 may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components.

Power supply 102 provides power to one or more of the controller 101, memory 103, telematics unit 105, dynamics sensor 106, auditory sensor 107, and communication device 105. The power supply 102 may include one or more from a battery, an outlet, a capacitor, a solar energy cell, a generator, a wind energy device, an alternator, etc.

Memory 103 is configured for recording information, storing information, and retrieving information used by system 100. Memory 103 may include the executable instructions configured to be read and executed by controller 101 so as to perform the functions of system 100. Memory 103 may also be controlled by controller 101 to record, store, and retrieve various types of data in databases such as, but not limited to, storing and retrieving mapping data in a mapping database 104.

Memory 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The mapping data in database 104 may act as a living canvas of high definition, three-dimensional topographical data that may include one or more high fidelity, latitudinal and longitudinal coordinates which generates an ultra-precise topographical layout of a select area. Each topographical coordinate generally corresponds to a single real-life road surface feature and may also include geometric and boundary information that is accurate to within a centimeter's distance from the corresponding real-life road feature. Other collaborating vehicle systems (e.g., sensor systems) may aggregately develop the mapping data through the implementation of one or more topographical coordinate updates (otherwise known as re-localization methods) to provide relevant coordinate information to database 104 as the vehicle goes from a first position to a second position. The mapping data may therefore be a useful navigational tool and provides accurate, up-to-date information of an area's road surface features such as, but not limited to, the expansion joint between a road and a bridge.

Mapping data, for example, may be implemented in autonomous vehicles (i.e., self-governing vehicles capable of sensing the surrounding environment and navigating without human input) and semi-autonomous vehicles to assist the vehicle to make correct, precise maneuvers which may not otherwise be made accurately through other vehicle systems. Skilled artisans will understand that topographical coordinate updates involve the manipulation of the preexisting mapping data by adding, modifying, or deleting at least a portion of the coordinate data in an effort to bring database 104 up-to-date. Skilled artisans will further understand that topographical coordinate updates may be provided to mapping data in a remote third-party database 104 from multiple vehicles (e.g. Road Experience Management and/or RoadDB)

Figure 2:
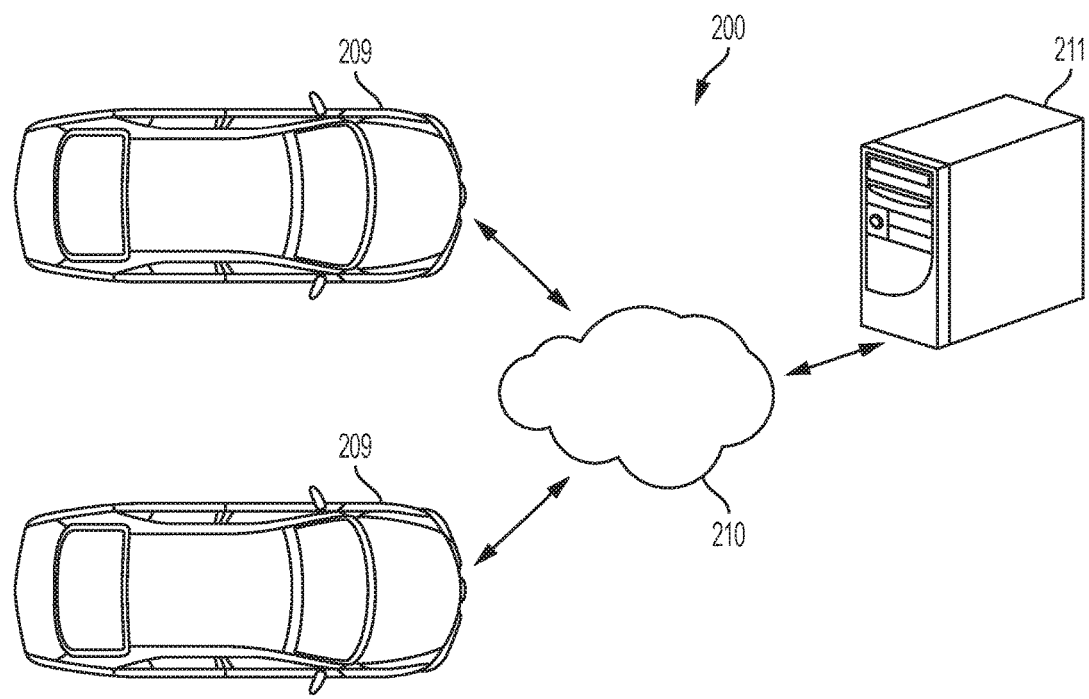
FIG. 2 shows an exemplary diagram of an exemplary system to develop topographical data.

Communication device 105 may be used by system 100 to communicate with various types of external, remote parties (FIG. 2). Communication device 105 may be used to send/receive certain communications such as, but not limited to, executable instructions/executable instruction updates for the mapping data 204 (e.g., software/software updates), topographical coordinate updates, and developed topographical data. These communications may be sent to remote parties such as, but not limited to, a call center, a computing device, or a mobile computing device. New or developed topographical data, executable instructions, and coordinate updates may also be downloaded from the call center, one or more computing devices, or one or more mobile computing devices via communication device 105.

The communication device 105 may include various peripheral communication modules of executable instructions. Such modules may include, but are not limited to, a GPS module, a broadcast receiving module, a near field communication (NFC) module, a wired communication module, and a wireless communication module. The broadcast receiving module may include a terrestrial broadcast receiving module including an antenna to receive a terrestrial broadcast signal, a demodulator, and an equalizer. The NFC module is a module that communicates with an external apparatus located at a nearby distance according to an NFC method. The GPS module is a module that receives a GPS signal from one or more GPS satellites of a satellite constellation and detects a current location. The wired communication module may be a module that receives information over a wired network such as a local area network, a controller area network (CAN), or an external network, via Ethernet cable, fiber optic cable, coaxial cable, etc. The wireless communication module is a module that is connected to an external network by using a wireless communication protocol such as Wi-Fi or IEEE communication protocol and communicates with the external network. The wireless communication module may further include a mobile communication module that accesses a mobile communication network and performs communication according to various mobile communication standards such as 3rd generation (3G), 3rd generation partnership project (3GPP), long term evolution (LTE), Bluetooth, or ZigBee. Skilled artisans will understand that communication device 105 may use one or more of these peripheral modules (or other modules not discussed herein) to send/receive the developed topographical data.

The dynamics sensor 106 may be one or more sensors connected with at least one of the vehicle dynamics systems (e.g., the vehicle's suspension system, tire pressure system, stability system, etc.). Dynamics sensor 106 is configured to sense for certain changes occurring when the vehicle encounters various road surface features (i.e., when one or more of the vehicle tires travel over the road surface feature). For example, dynamics sensor 106 can detect the vibration impulses on the vehicle suspension system that occur during the vehicle ingress and egress of a bridge (i.e., while travels over the bridge expansion joints). After such an encounter, dynamics sensor 106 may send an unambiguous surface-variation signal to controller 101. Dynamics sensor 106 may also be configured to analyze information on the waveform generated by the exemplary vibratory impulse to determine the type of road surface feature encountered and send a surface-variation signal only when dynamics sensor 106 determines the encountered road surface feature conforms to a proper type. For example, dynamics sensor 106 can determine whether the vehicle encountered a pothole, rumble strip, lane-cross gap, road surface change, or an expansion joint. But sensor 106 will only send the surface-variation signal when the road surface feature encountered is an expansion joint.

Auditory sensor 107 is configured to listen to road noise generated when the vehicle encounters various road surface features (i.e., when the vehicle tires travel over the road surface feature). The auditory sensor may include one or more microphones that may be strategically placed at various locations on a vehicle. For example, the one or more microphones may be positioned on the undercarriage of the vehicle, body mounts, wheel bearings, an engine compartment, and/or at a wheel well, etc. The microphones can detect audible waveforms generated when the vehicle encounters the road surface feature. After such an encounter, auditory sensor 107 may send an unambiguous surface-variation signal to controller 101. Auditory sensor 107 may also be configured to analyze information on the audible waveform to determine the type of road surface feature encountered and subsequently send a surface-variation signal only when auditory sensor 107 determines the encountered road surface feature conforms to a proper type. For example, auditory sensor 107 can determine whether the vehicle encountered a pothole, rumble strip, lane-cross gap, road surface change, or an expansion joint. But sensor 107 will only send the surface-variation signal when the road surface feature encountered is an expansion joint.

According to an exemplary aspect, controller 101 is configured to receive the surface-variation signal from either dynamics sensor 106 or auditory sensor 107 and subsequently collaborate with the mapping database 104 to develop the topographical data with a topographic coordinate update. According to another exemplary aspect, controller 101 is configured to receive an ambiguous surface-variation signal from either dynamics sensor 106 or auditory sensor 107, subsequently collaborate with mapping database 104 to determine the road surface feature based off at least a selected portion of the topographical data, and collaborate with mapping database 104 to develop the topographical data with a topographic coordinate update when the road surface feature is determined of a certain type. According to a further exemplary aspect, controller 101 is configured to receive a first surface-variation signal from dynamics sensor 106, receive a second surface-variation signal from auditory sensor 107, verify the accuracy of the first and second topographical coordinate updates contained within the first and second surface-variation signals are substantially identical, and collaborate with mapping database 104 to develop the topographical data with one of the first and second topographic coordinate updates when the first and second surface-variation signals are verified to be accurate. Controller 101 may be further configured to collaborate with the communication device 105 and memory 103 to send a remote party communications comprising the developed topographical data.

FIG. 2 shows a diagram of system 200 to develop topographical data in mapping database 204, according to an exemplary aspect. Referring to FIG. 2, vehicles 209 may also implement their communication device 205 to transmit and receive communications (information) over network 210 to and from a memory 203 (discussed above) generally located within a remote server 211 (i.e., remote party). The communications that may be transmitted or received or both transmitted and received by one or more vehicles 209 may include, but is not limited to, executable instructions/executable instruction updates for the mapping data 204, topographical coordinate updates, and developed topographical data. In order to transmit and receive communications over network 210 as well as perform the functions that develop topographical data in mapping database 104, vehicles 209 or server 211 or both vehicles 209 and server 211 may include one or more controllers 201 configured to execute instructions for the mapping data 204 as stored in memory 203 of server 203.

Figure 3:
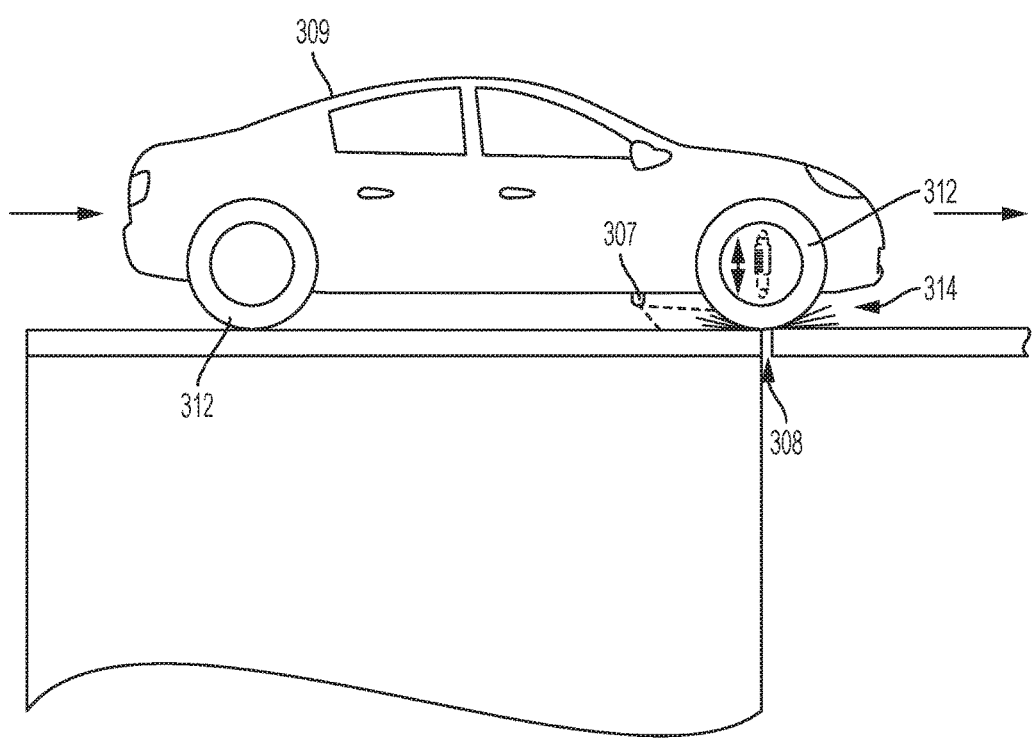
FIG. 3 shows aspects of the exemplary system to develop topographical data being implemented in an exemplary vehicle environment.
Figure 3A:
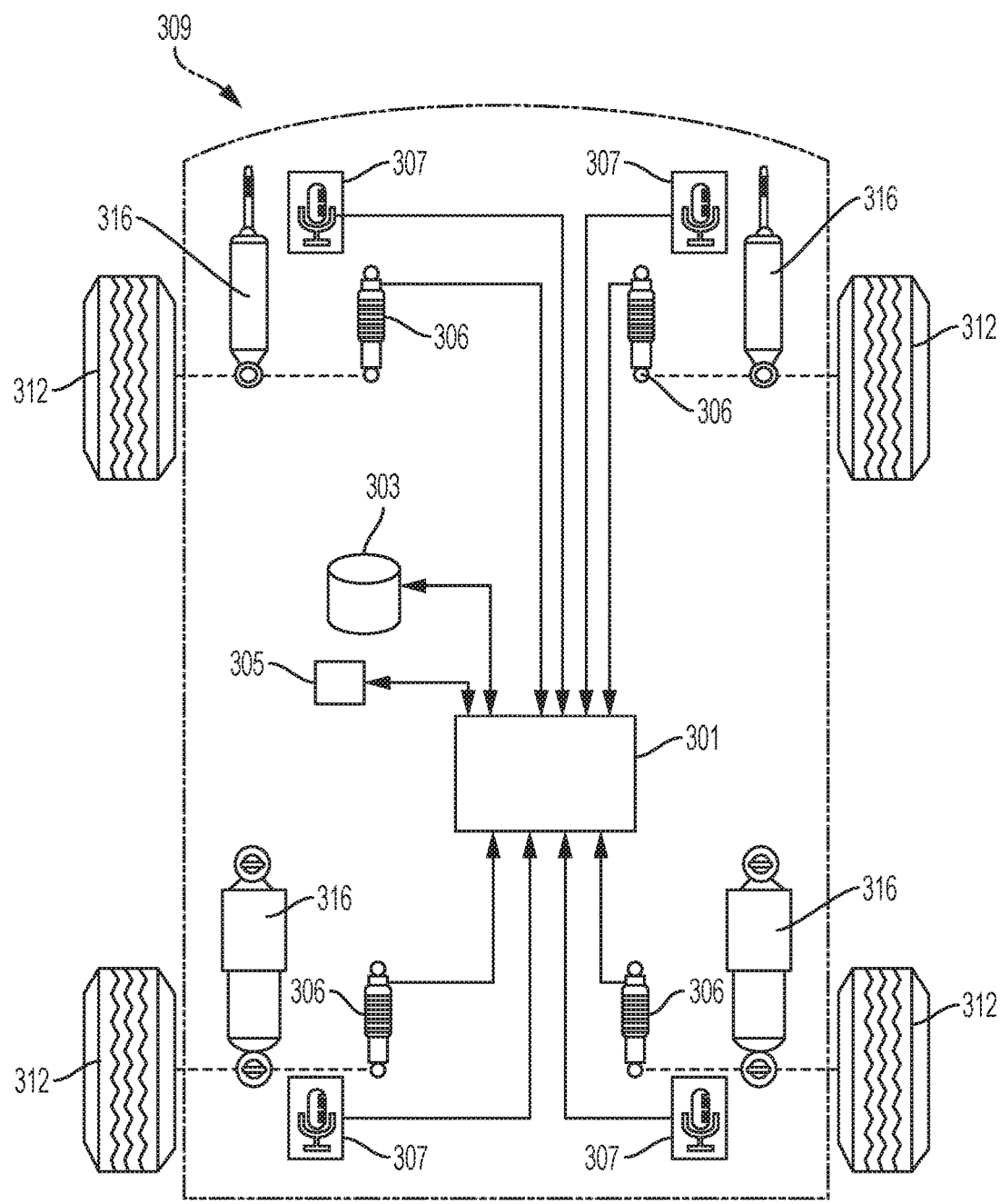
FIG. 3A shows a diagram of the exemplary vehicle of FIG. 3 with the exemplary system of FIG. 3 incorporated therein.

FIGS. 3 and 3A show an aspect of system 300 wherein system 300 is being implemented in vehicle 309 and as vehicle 309 encounters an exemplary road surface feature 308. As shown, as vehicle front tire 312 rolls over road surface feature 308, exemplified as a road-bridge expansion joint, the corresponding vibratory impulse 313 causes tire 312 to move up and down. This impulse in turn causes vibrations in the weight-bearing vehicle suspension system 316. Dynamics sensors 306, shown as being connected in parallel to multiple suspension points of suspension system 316, which may be configured to measure the relative vertical position of suspension system 316, analyze the impulsive movement and subsequently generate a surface-variation signal to be sent to controller 301. In other exemplary aspects of system 300, as discussed above, sensor 306 may be configured to compute/analyze information on the vibratory impulse such as, but not limited to, the generated waveform or impulse force and then determine the type of road surface feature encountered. As such, only when the waveform information shows that the type of road surface feature being encountered is considered one of a certain type (e.g., an expansion join, pothole, rumble strip, lane-cross gap, road surface change, etc.), the dynamics sensor will send a surface-signal to controller 301.

Exemplary dynamics sensors 306 may be embodied as one or more Inertial Measurement Units and suspension system 316 may, for example, be a magnetic ride system incorporating magnetically-controlled damper devices (not shown). Exemplary dynamics sensors 306 may also be embodied as one or more tire pressure sensors typically located within a vehicle tire (not shown). As such, dynamics sensors 306 would measure and analyze pressure variations within the tire, as the vehicle encounters a road surface feature 308. Exemplary dynamics sensors 306 may further be embodied as one or more yaw-rate sensors (rotational speed sensors) typically located in the vehicle stability system (not shown). This embodiment of dynamic sensors 306 would thus measure and analyze the vehicle's angular velocity on its vertical axis (i.e., vehicle tilt), as the vehicle encounters a road surface feature 308.

Auditory sensor 307 is moreover shown as a microphone positioned to listen for specific road noise from the vehicle 309 undercarriage. As the vehicle front tire 312 rolls over feature 308, sensor 307 picks up the road noise, analyzes the picked up noise, and subsequently sends the surface-signal to the vehicle controller 301. In other exemplary aspects of system 300, as discussed above, sensor 307 may be configured to analyze information on the waveform generated by the road noise and then determine the type of road surface feature encountered. As such, only when the waveform information shows that the type of road surface feature being encountered is considered one of a suitable type (e.g., an expansion join, pothole, etc.), auditory sensor 307 will send the surface-signal to controller 301. It should be appreciated that either dynamics sensor 306 or auditory sensor 307 may be implemented at one time to send the surface-variation signal or they may be used simultaneously. It should be further appreciated that vehicle 309 may only have one of the two sensors 306, 307 installed at one time.

It should be understood that the road surface feature 308 may otherwise be the rumble strip typically located at one or both sides of a road. Road surface feature 308 may also be a road surface change such as, but not limited to, paint placed on the road (e.g., road perimeter designators) or changes in asphalt composition/age. Road surface feature 308 may further be a lane-cross gap (for lateral localization), which are changes is road height brought on by additional layers of asphalt applied to the road for various reasons.

Figure 3B:
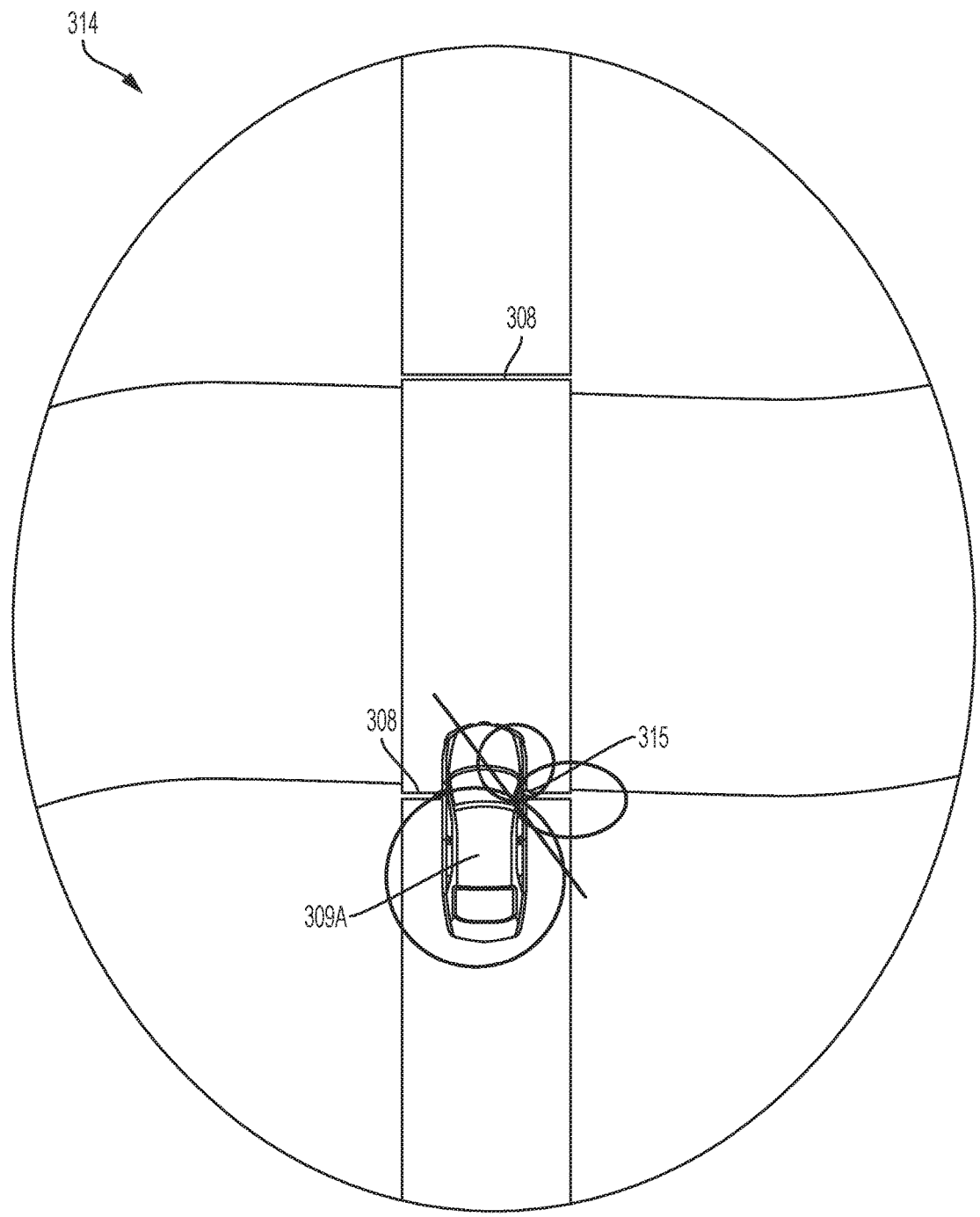
FIG. 3B shows other aspects of the exemplary system to develop topographical data.

FIG. 3B shows the living canvas of high definition, three-dimensional topographical data having multiple data coordinates to create the virtual environment of mapping data, which corresponds to the real-life environment of FIG. 3, as generally indicated by reference numeral 314. After receiving the surface-variation signal, controller 301 will access executable instructions in memory 303 to collaborate with database 304 and develop the topographical data environment 314 with one or more updates to the topographical coordinates 315. As shown, an updated coordinate 315 is collected and added into mapping data 314 at a virtual location representing the point at which front tire 312A of a virtual representation of vehicle 309A would meet the road surface feature 308A in real life. This update 315 may be incorporated to further assist in defining the virtual lane curvature, lane width, lane breaking points, and/or other lane attributes of topographical data 314. As such, when vehicle 309 returns to the real life location exemplified in FIG. 3, the topographical data 314 will have been relocalized and facilitate improved vehicle performance.

Coordinate 315 is generally updated through executable instructions implementing localization methodologies, which may mimic known exemplary trilateralization methods. In certain instances, controller 301 may access executable instructions in memory 303 to collaborate with database 304 and determine the encountered road surface feature through information contained within the surface-variation signal. In such instances, controller 301 will only collaborate with database 304 and develop the data environment 314 with an update 315 when the road surface feature is considered a certain type (e.g., expansion joint). It should be understood that localization methodologies other than mimicked trilateralization methodologies may be implemented to update coordinate 315.

Figure 4:
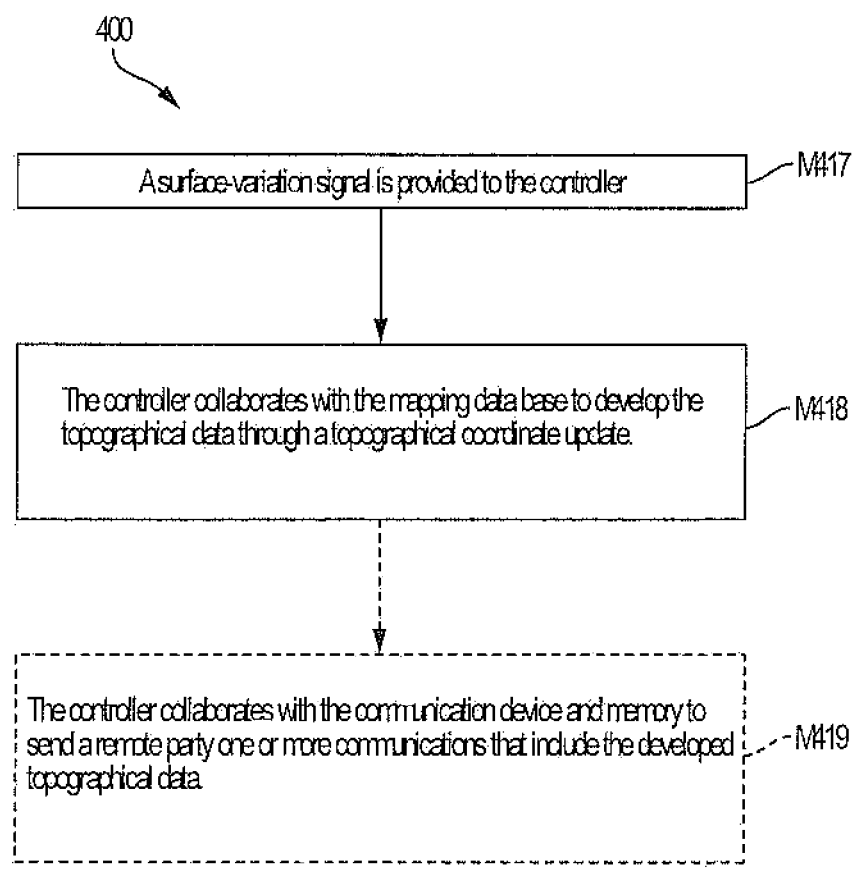
FIG. 4 shows a flow chart generally illustrating an exemplary method that may be performed to develop topographical data in a mapping database.

An exemplary method 400 to develop topographical data in a mapping database is described with reference to FIG. 4. Referring to FIG. 4, a surface-variation signal is provided to controller 101 (FIG. 1) in operation M417. During operation M418, controller 101 collaborates with mapping data base 104 (FIG. 1) to develop the topographical data 314 (FIG. 3B) through a topographical coordinate update 315 (FIG. 3B). During optional operation M419, controller 101 collaborates with communication device 105 (FIG. 1) and memory 103 (FIG. 3) to send a remote party 211 (FIG. 2) communications that include the developed topographical data.

Figure 5:
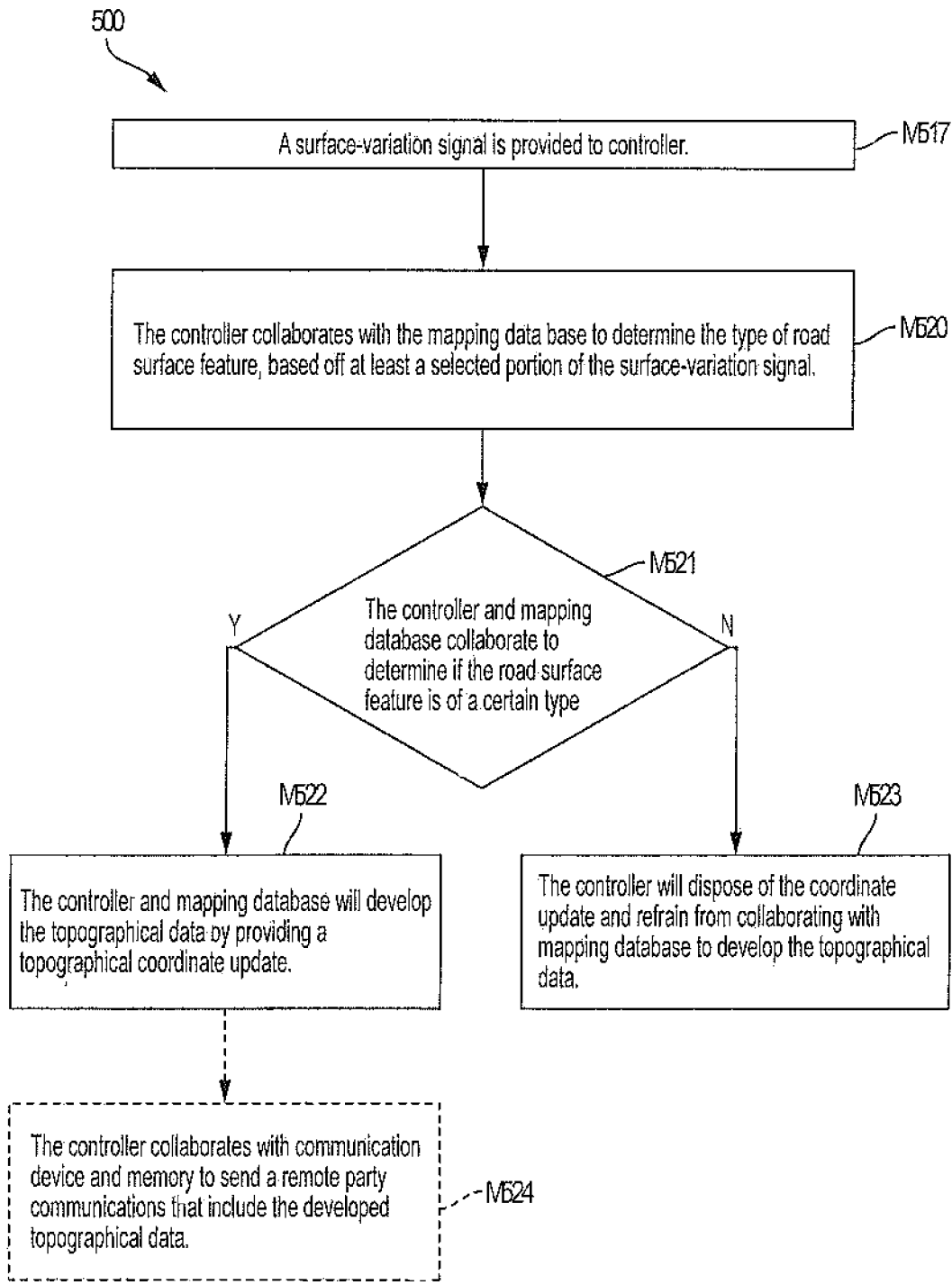
FIG. 5 shows a flow chart generally illustrating another exemplary method that may be performed to develop topographical data in a mapping database.

An exemplary method 500 to develop topographical data is described with reference to FIG. 5. Referring to FIG. 5, a surface-variation signal is provided to controller 101 (FIG. 1) in operation M517. During operation M520, controller 101 collaborates with mapping data base 104 (FIG. 1) to determine the type of road surface feature 308 (FIG. 3), based off at least a selected portion of the surface-variation signal. During operation M521, controller 101 and mapping database 104 collaborate to determine if the road surface feature 308 is of a certain type. If the road surface feature 308 is a certain type, method 500 will move to operation M522 and controller 101 and mapping database 104 will develop the topographical data 314 (FIG. 3B) by providing a topographical coordinate update 315 (FIG. 3B). Method 500 may moreover move to optional operation M524 where controller 101 collaborates with communication device 105 (FIG. 1) and memory 103 (FIG. 3) to send a remote party 211 (FIG. 2) communications that include the developed topographical data. However, if it is determined that the road surface feature 308 is not a certain type, method 500 will move to operation M523 and controller 101 will dispose of the coordinate update 315 and refrain from collaborating with mapping database 104 to develop the topographical data 314.

Figure 6:
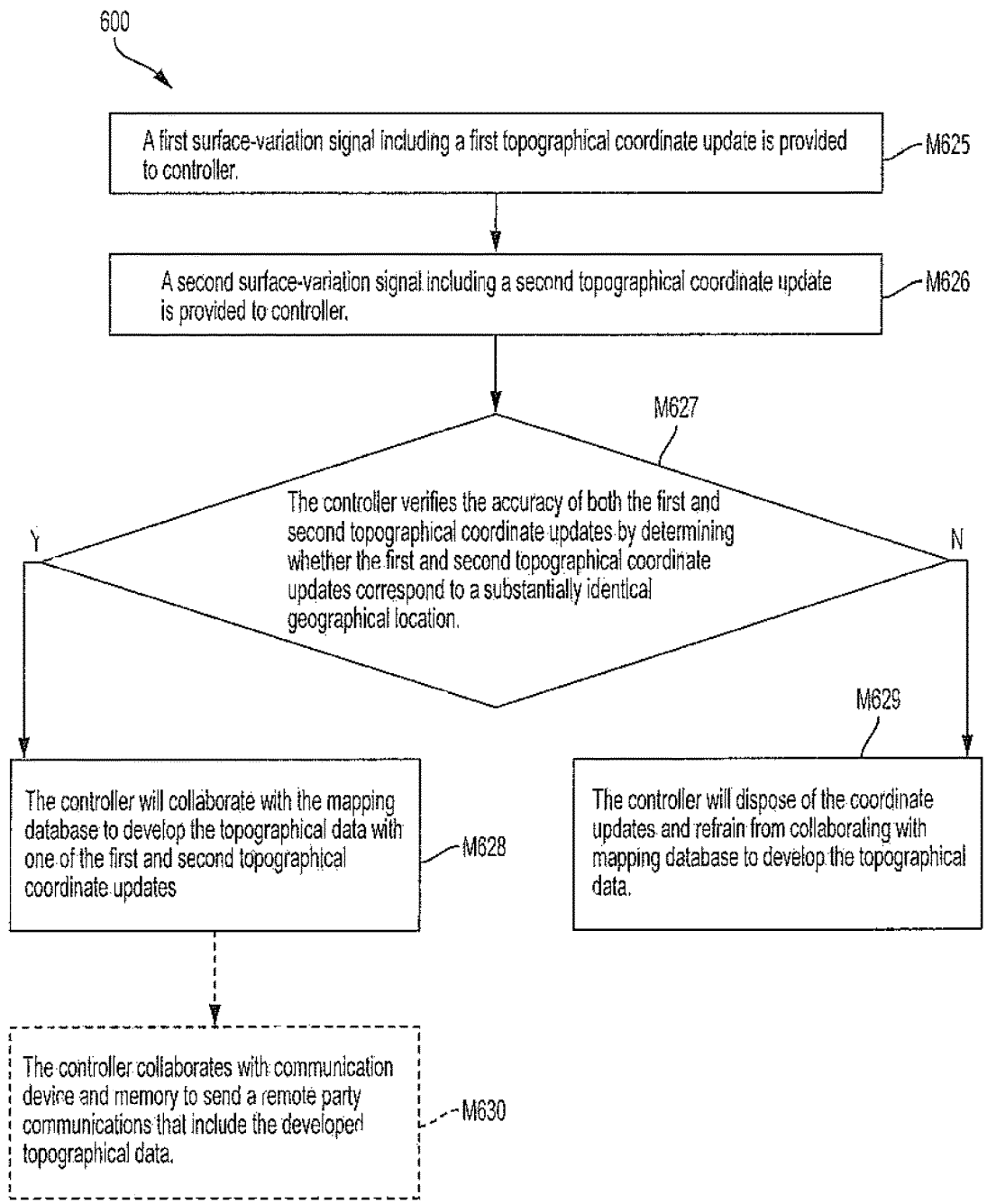
FIG. 6 shows a flow chart generally illustrating another exemplary method that may be performed to develop topographical data in a mapping database.

An exemplary method 600 to develop topographical data is described with reference to FIG. 6. Referring to FIG. 6, a first surface-variation signal including a first topographical coordinate update is provided to controller 101 (FIG. 1) in operation M625 and a second surface-variation signal including a second topographical coordinate update is provided to controller 101 in operation M626. During operation M627, controller 101 verifies the accuracy of both the first and second topographical coordinate updates 315 (FIG. 3A) by determining whether the first and second topographical coordinate updates 315 correspond to a substantially identical geographical location. If the coordinate updates do correspond to the same geographical location (i.e., if they are within a certain predefined distance from each other), in operation M628, controller 101 will collaborate with the mapping database 104 (FIG. 1) to develop the topographical data 314 (FIG. 3B) with one of the first and second topographical coordinate updates 315. It should be appreciated the predefined distance be a centimeter.

Method 600 may moreover move to optional operation M630 such that controller 101 collaborates with communication device 105 (FIG. 1) and memory 103 (FIG. 3) to send a remote party 211 (FIG. 2) communications that include the developed topographical data. If it is determined the first and second topographical coordinate updates 315 do not correspond to the same location, however, in operation M629, controller 101 will dispose of the coordinate updates 315 and refrain from collaborating with mapping database 104 to develop the topographical data 314.

The methods discussed above (methods 400, 500, and 600) may be performed by any of the examples of system 100, as discussed above, or they may be encoded into a computer-readable medium as instructions that are executable by a computer (e.g., controller 101) to perform the method. Additionally, the operations of these methods may be performed by system 100 when embedded in a vehicle, a server that is in communication with the vehicle over a network, or a combination of the server that communicates with the vehicle over a network and system 100 while embedded in the vehicle.

It is to be understood that the above disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Features of the system as well as the method disclosed herein can be deliverable to/implemented by a processing device, controller, or computer, which can include any existing programmable electronic control unit or dedicated electronic control unit. Similarly, the system features and method can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The system features and method can also be implemented in a software executable object. Alternatively, the system features and method can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a memory non-transitory comprising one or more executable instructions and a mapping database;
   a controller configured to read and execute the one or more executable instructions;
   a communication device configured to communicate with one or more remote servers:
   a dynamics sensor connected with a vehicle suspension system, the dynamics sensor configured to detect one or more vibration impulses on the vehicle suspension system generated by one or more encountered road features, the dynamics sensor further configured to analyze information on the waveform generated by the one or more vibration impulses to determine the encountered road surface feature type and, based on the encountered road surface feature type, generate a first surface-variation signal;

an auditory sensor positioned on one of the undercarriage of the vehicle, body mounts, wheel bearings, engine compartment, or wheel well, the auditory sensor configured to listen to noise generated by one or more encountered road surface features, the auditory sensor further configured to analyze information on the audible waveform generated by the noise to determine the encountered road surface feature type and, based on the encountered road surface feature type, generate a second surface-variation signal;

wherein the executable instructions enable the controller to:

receive the first surface-variation signal from the dynamics sensor;

receive the second surface-variation signal from the auditory sensor;

verify the accuracy of both the first and second surface-variation signals by determining the signals correspond to substantially the same geographical location;

when the first and second surface-variation signals are verified as accurate, collaborate with the mapping database to develop topographical data including a topographical coordinate update derived from the first and second surface-variation signals, wherein the developed topographical data is configured to be received and executed by a remote server; and collaborate with the communication device to send the remote server one or more communications comprising the developed topographical data.

2. The vehicle of claim 1, wherein the encountered road surface feature is one of a expansion joint, rumble strip, lane-cross gap, pothole, or road surface change.

3. The vehicle of claim 1, wherein:

the vehicle is an autonomous vehicle; and the mapping data can be used by the remote server to assist the vehicle to make one or more maneuvers without human input.

4. The vehicle of claim 1, wherein the remote server is located in a call center.

5. The vehicle of claim 1, wherein:

the mapping database comprises mapping data that acts as a living canvas of high definition, three-dimensional topographical data incorporating one or more coordinates to generate an ultra-precise topographical layout of a select area; and wherein the topographical coordinate update or the developed topographical data is collected and added into the mapping data.

* * * * *